United States Patent
Jensen

(10) Patent No.: US 6,912,051 B2
(45) Date of Patent: Jun. 28, 2005

(54) WAVEMETER WITH INCREASED WAVELENGTH RANGE

(75) Inventor: Thomas Jensen, Stuttgart (DE)

(73) Assignee: Agilent Technologies, Inc., Palo Alto, CA (US)

(*) Notice: Subject to any disclaimer, the term of this patent is extended or adjusted under 35 U.S.C. 154(b) by 183 days.

(21) Appl. No.: 10/145,064

(22) Filed: May 14, 2002

(65) Prior Publication Data

US 2003/0076503 A1 Apr. 24, 2003

(30) Foreign Application Priority Data

Oct. 20, 2001 (EP) .......................................... 01 125 041

(51) Int. Cl.$^7$ ................................................. G01B 9/02
(52) U.S. Cl. ...................................... 356/450; 356/454
(58) Field of Search ................................ 356/450, 454, 356/519, 480; 372/20, 25, 32, 55, 57, 58

(56) References Cited

U.S. PATENT DOCUMENTS

| | | | | |
|---|---|---|---|---|
| 4,309,108 A | * | 1/1982 | Siebert ........................ | 356/519 |
| 5,550,636 A | * | 8/1996 | Hagans et al. ............... | 356/437 |
| 6,421,120 B1 | * | 7/2002 | Wildnauer ................ | 356/243.1 |
| 6,500,521 B2 | * | 12/2002 | O'Brien ....................... | 428/156 |

FOREIGN PATENT DOCUMENTS

| | | |
|---|---|---|
| EP | 1 099 943 A1 | 5/2001 |
| GB | 2 350 184 A | 11/2000 |
| GB | 2 353 858 A | 3/2001 |

OTHER PUBLICATIONS

Jacquin, J., Examiner. European Search Report, Application No. EP 01 12 5041, dated Mar. 19, 2002.

* cited by examiner

*Primary Examiner*—Gregory J. Toatley, Jr.
*Assistant Examiner*—Andrew H. Lee

(57) ABSTRACT

A wavemeter (30) comprises a first wavelength determination unit (40) having a substantially periodic wavelength dependency and being adapted for providing a reference wavelength dependency (100) over a reference wavelength range. A second wavelength determination unit (50) has a substantially periodic wavelength dependency and is adapted for providing a second wavelength dependency (140) over a second wavelength range (120). An evaluation unit (60) compares the second wavelength dependency (140) with the reference wavelength dependency (100) for adjusting (160) the second wavelength dependency (140) in wavelength.

10 Claims, 1 Drawing Sheet

WAVEMETER WITH INCREASED WAVELENGTH RANGE

BACKGROUND OF THE INVENTION

The present invention relates to determining the wavelength of optical signals.

Determining the wavelength of optical signals is common object in optical applications. A description of the most common principles is given in EP-A-1099943 and the teaching thereof is incorporated herein by reference.

Accuracy and wide wavelength application range represent contravening requirements to wavemeters. Generally, wavemeters either provide high-accuracy over a limited wavelength range, such as absolute wavelength references (e.g. gas cells) as disclosed e.g. in U.S. Pat. No. 5,780,843, or wavemeters show a wide applicable wavelength range with limited accuracy, such as EP-A-875743.

SUMMARY OF THE INVENTION

It is an object of the present invention to provide an improved wavemeter. The object is solved by the independent claims. Preferred embodiments are shown by the dependent claims.

A wavemeter according to the present invention comprises two interferometric wavelength determination units and an evaluation unit. In a first operation mode, the first wavelength determination unit is employed to determine a reference interferogram over a reference wavelength range. The reference wavelength range preferably represents the entire applicable wavelength range for the wavemeter or covers at least one known wavelength event. The reference interferogram is preferably provided with reduced wavelength accuracy in order to limit the data volume required.

In a second operation mode, each of the first and second wavelength determination units will be employed to provide an interferogram over a measurement wavelength range. The measurement wavelength range is preferably selected to be smaller than the reference wavelength range in order to limit the volume of the data acquisition.

In a preferred embodiment, the interferogram of the first wavelength determination unit is obtained with substantially the same accuracy as the reference interferogram, while the second wavelength determination unit will obtain an interferogram with higher (preferably substantially higher) accuracy.

The evaluation unit receives the interferograms from the first and second wavelength determination units and compares the first interferogram from the first wavelength determination unit with the reference interferogram in order to determine a phase offset therebetween. The determined phase offset is then employed to adjust the second interferogram provided by the second wavelength determination unit. Thus, the higher accuracy interferogram provided by the second wavelength determination unit can be calibrated by the reference interferogram as provided by the first wavelength determination unit.

In a preferred embodiment, a wavelength reference point is employed for determining the phase offset between the first and the reference interferogram. The wavelength reference point identified in both the first and the reference interferograms thus leads to the phase offset therebetween. The wavelength reference point can be e.g. a start point of the wavelength range of the first interferogram or any other identifiable wavelength point. Preferably, the wavelength reference point is already known (e.g. provided by a signal source providing the wavelength signal as input for the wavemeter), but might also be determined by the wavemeter preferably employing a coarse wavelength determination unit as disclosed in the European Patent Application No. 0117607.2.

In a preferred embodiment, the reference interferogram is calibrated by at least one absolute wavelength feature covered in the reference wavelength range. In this case, the higher relative accuracy interferogram provided by the second wavelength determination unit can be absolutely calibrated by the reference interferogram. This is preferably accomplished making use of an absolute wavelength reference unit, such as a gas cell, as disclosed e.g. in the European Patent Application No. 01109135.2 by the same applicant. The teaching of that document with respect to the calibration of measurement results making use of absolute wavelength references shall be incorporated herein by reference.

Thus, the generally limited applicable wavelength range of absolute wavelength reference units can be expanded virtually to and is limited only by the accuracy of the first wavelength determination unit.

In a preferred embodiment, the first operation mode (providing the reference interferogram) and the second operation mode (providing the first and second interferograms in the measurement wavelength range) are performed within such time interval wherein the environmental conditions for both measurements can be regarded as substantially equal or constant.

In another preferred embodiment, the first and second operation modes are combined as one wavelength sweep. Thus, the reference interferogram and the first interferogram coincide, and the measurement wavelength range coincides with the reference wavelength range. In this case, no phase offset has to be determined (or in other words, the phase offset is automatically zero), and the second interferogram is automatically adjusted to the reference interferogram.

The wavemeter of the present invention can be employed e.g. for monitoring a wavelength sweep of a light source tunable in wavelength or for determining discrete wavelength values. In the former case, the wavemeter preferably determines the variation of wavelength over the time, which might be employed for correcting measurement results as disclosed in detail in the aforementioned European Patent Application No. 01109135.2 by the same applicant. The teaching of that document with respect to measurement correction shall be incorporated herein by reference. In the latter case, a discrete wavelength value can be received by using a start value for determining the period covering the wavelength value and then detecting the actual wavelength value within that period as described in detail e.g. in the aforementioned EP-A-875743.

It is clear that the invention can be partly embodied or supported by one or more suitable software programs, which can be stored on or otherwise provided by any kind of data carrier, and which might be executed in or by any suitable data processing unit. In particular the signal processing as provided by the evaluation unit can be embodied using software.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
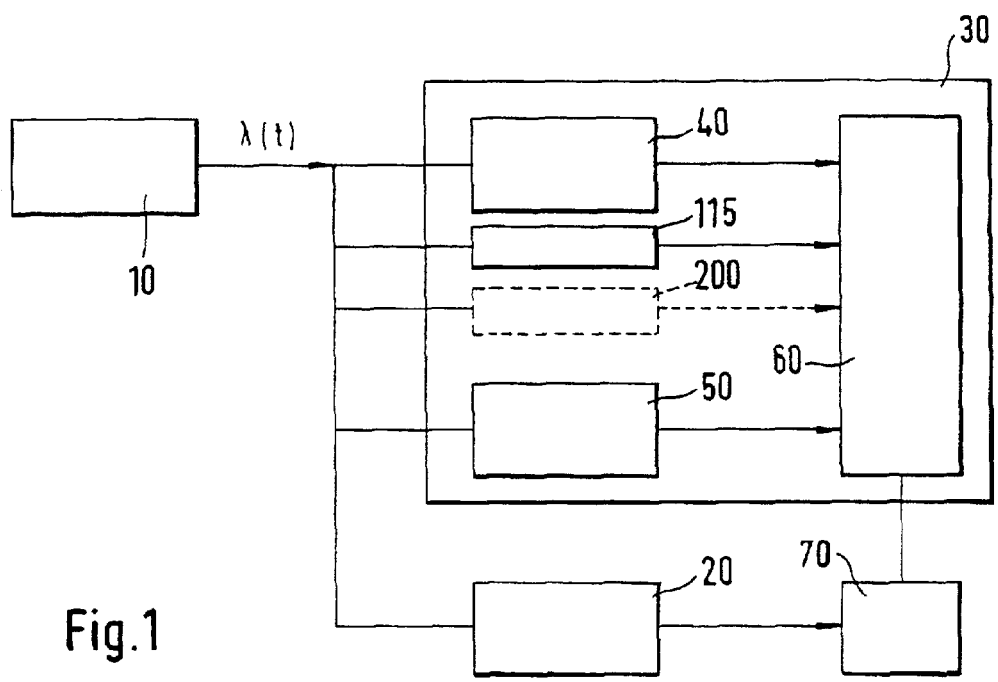
FIG. 1 shows an improved embodiment of a wavemeter according to present invention in a measurement setup.

In FIG. 1, a tunable laser source 10 provides a laser signal λ(t) with varying wavelengths over time. The laser signal λ(t) is provided to a device under test (DUT) 20 as well as to a wavemeter 30. The wavemeter 30 comprises first and second wavelength determination units 40 and 50, each receiving the laser signal λ(t) and providing an output to an evaluation unit 60 of the wavemeter 30. A measurement unit 70 receives a response signal from the DUT 20 on the laser signal λ(t) as well as an output signal from the evaluation unit 60 (which also represents an output of the wavemeter 30).

Figure 2:
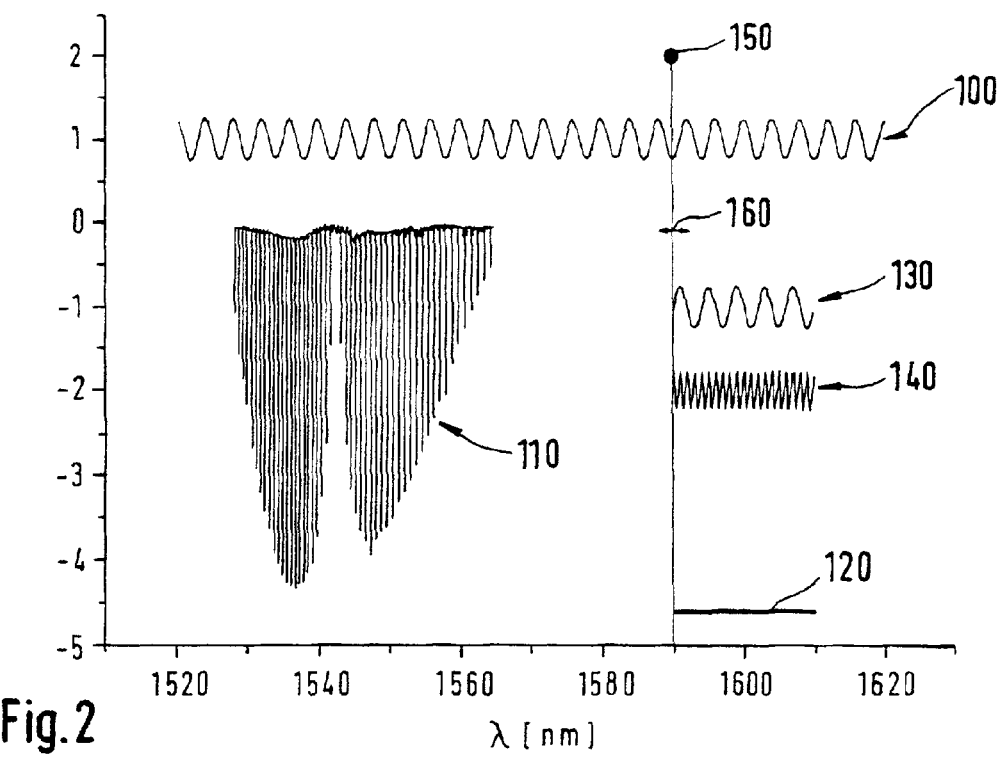
FIG. 2 illustrates the wavelength determination according to the present invention.

In operation (as illustrated in FIG. 2), the tunable laser source 10 provides a wavelength sweep λ(t) over a wide wavelength range (in the example of FIG. 2, over a wavelength range from 1520 to 1620 nm). The first wavelength determination unit 40 provides a reference interferogram 100 having a period $p_r$ over the swept wavelength range. In the example of FIG. 2, the first wavelength determination unit 40 provides the interferogram with the period $p_r$ of roughly 4 pm and a wavelength increment of about 1 pm.

In a preferred embodiment, the reference interferogram 100 is calibrated making use of absolute wavelength features 110 as provided e.g. by a gas cell 115. Details of such calibration process are disclosed in detail in the co-pending European Patent Application No. 01109135.2 by the same applicant. The wavelength sweep is preferably selected to cover the gas cell spectrum 110 and a desired wavelength span 120 for later testing the DUT 20. The period $p_r$ and the phase of the reference interferogram 100 can be calculated very accurately and calibrated by the absolute gas cell features 110. Thus, the wavelength behavior of the reference interferogram 100 can be very accurately known also within the DUT span 120.

A second wavelength sweep is performed, preferably directly after the first wavelength sweep in order to make sure that environmental conditions possibly affecting the period of the first wavelength determination unit 40 remains substantially constant. In this second wavelength sweep, the tunable laser source 10 will provide a wavelength sweep λ(t) over the DUT span 120. The DUT span 120 represents such measurement range for actually measuring wavelength properties of the DUT 20. During the second wavelength sweep, the first wavelength determination unit 40 provides a first measurement interferogram 130, and the second wavelength determination unit 50 provides a second measurement interferogram 140.

The first and second measurement interferograms 130 and 140 are preferably sampled with increased accuracy with respect to the first wavelength sweep for determining the reference interferogram 100. In the example of FIG. 2, the wavelength increment for detecting the interferograms 130 and 140 are provided with about 0.05 pm (in contrast to about 1 pm for the reference interferogram 100). Accordingly, only the second measurement interferogram 140 might be sampled with increased accuracy with respect to the reference interferogram 100.

While the period $p_r$ of the first wavelength determination unit 40 remains substantially the same during both wavelength sweeps (interferograms 100 and 130), a period $p_2$ of the second wavelength determination unit 50 is preferably selected to be smaller than the period $p_r$ of the first wavelength determination unit 40 in order to provide improved measurement accuracy. In the example of FIG. 2, the period $p_2$ is roughly 0.2 pm (in contrast to the period $p_r$ of roughly 4 pm).

Differences in the period $p_r$ between the two wavelength sweeps might arise from different measuring conditions during the wavelength sweeps and might be compensated or simply neglected dependent on the required accuracy.

The evaluation unit 60 receives the measurement results of both wavelength determination units 40 and 50 for both wavelength sweeps. In case that a wavelength start point 150 of the DUT span 120 is not already known (e.g. as provided by the tunable laser source 10), the wavemeter 30 might further comprise a coarse wavelength determination unit 200 for unambiguously determining the wavelength of the signal λ(t) and thus the wavelength start point 150 of the tunable laser source 10. Preferably, the coarse wavelength determination unit 200 determines the wavelength with lower accuracy then the first and second wavelength determination unit 40 and 50, and might be embodied as disclosed in the aforementioned EP-A-1099943 (which teaching with respect to the coarse wavelength measurement shall be incorporated herein be reference).

The wavelength start point 150 preferably represents the first (valid) wavelength point of the DUT span 120. However, different wavelength points can be applied accordingly.

The evaluation unit 60 will then identify the wavelength start point 150 inside one period of the first measurement interferogram 130 as well as inside one period of the reference interferogram 100. The evaluation unit 60 then determines a phase offset as the phase difference between the first measurement interferogram 130 and the reference interferogram 100 at the wavelength start point 150. This determined phase offset then allows adjusting the second measurement interferogram 140 in wavelength (i.e. along the wavelength axis in FIG. 2 as indicated by arrow 160).

The evaluation unit 60 and the measurement unit 70 are preferably synchronized, so that the measurement unit 70 can associate to each received response signal from the DUT 20 a corresponding wavelength value of the stimulus laser signal.

In case that the reference interferogram 100 has been calibrated making use of the absolute wavelength features 110, the high accuracy of the absolute wavelength feature 110 can be transferred via the first and second wavelength determination units 40 and 50 also to the DUT spectrum range 120. Thus, the second wavelength determination unit 50 can provide a relative error smaller than 0.02 pm and an absolute error smaller than 0.4 pm resulting in a total error smaller than 0.5 pm in the DUT spectrum range 120. This can be achieved with the first wavelength determination unit 40 having a relative error smaller than 0.2 pm and an absolute error smaller 0.2 pm as calibrated by an HCN gas cell (with spectrum 110), whereby the tunable laser source 10 provides the wavelengths start point 150 with a relative error of 3–4 pm and an absolute error of 3 pm.

What is claimed is:
1. A wavemeter comprising:
   a first interferometric wavelength determination unit having a substantially periodic wavelength dependency and providing a reference interferogram over a reference wavelength range;

a second interferometric wavelength determination unit having a substantially periodic wavelength dependency and providing a second interferogram over a second wavelength range; and an evaluation unit for comparing the second interferogram with the reference interferogram for adjusting the second interferogram in wavelength, wherein the evaluation unit determines a phase offset between a first interferogram, as provided by the first interferometric wavelength determination unit over the second wavelength range, and the reference interferogram for adjusting the second interferogram in wavelength.

2. The wavemeter of claim 1, wherein the second wavelength range is smaller than the reference wavelength range.

3. The wavemeter of claim 1, wherein the accuracy of the second interferogram is higher than the accuracy of the reference interferogram.

4. The wave meter of claim 1, further comprising an absolute wavelength unit having at least one absolute wavelength feature within the reference wavelength range for calibrating in wavelength the reference interferogram.

5. A system for determining an optical property of a device under test (DUT), comprising:

a wavemeter according to claim 1, a light source tunable in wavelength for providing a light signal ($\lambda(t)$) with varying wavelengths over time to the DUT as well as to the wavemeter, and a measurement unit for determining the optical property of the DUT from a response signal from the DUT on the light signal ($\lambda(t)$) as well as from an output signal of the wavemeter for monitoring a wavelength sweep or for determining discrete wavelength values of the light signal ($\lambda(t)$).

6. A method comprising the steps of:

(a) providing a reference interferogram over a reference wavelength range making use of a first interferometric wavelength determination unit having a substantially periodic wavelength dependency, (b) providing a second interferogram over a second wavelength range making use of a second interferometric wavelength determination unit having a substantially periodic wavelength dependency, (c) providing a first interferogram by the first interferometric wavelength determination unit over the second wavelength range;

(d) comparing the second interferogram with the reference interferogram, and (e) adjusting the second interferogram in wavelength based on the comparison in step (d), wherein step (d) comprises a step of determining a phase offset between the first interferogram and the reference interferogram, and step (e) comprises step of adjusting the second interferogram in wavelength using the determined phase offset.

7. The method of claim 6, wherein the step of determining the phase offset comprises the steps of:

identifying a wavelength reference point in the first interferogram as well as in the reference interferogram, and determining the phase offset as the phase difference between the first interferogram and the reference interferogram at the wavelength reference point.

8. The method of claim 6, wherein steps (a) and (b) are performed within such time interval wherein the environmental conditions for both steps (a) and (b) can be regarded as substantially equal or constant.

9. The method of claim 6, further comprising the steps of: determining at least one absolute wavelength feature within the reference wavelength range, and calibrating the reference interferogram in wavelength based on the determined at least one absolute wavelength feature.

10. A software program on a data carrier, for executing the method of claim 6, when run on a data processing system.

* * * * *